United States Patent
Farkas et al.

(10) Patent No.: US 9,888,479 B2
(45) Date of Patent: Feb. 6, 2018

(54) METHOD AND SYSTEM FOR IMPROVING EFFICIENCY IN A CELLULAR COMMUNICATIONS NETWORK

(71) Applicant: COLLISION COMMUNICATIONS, INC., Peterborough, NH (US)

(72) Inventors: Joseph Farkas, Merrimack, NH (US); Brandon Hombs, Merrimack, NH (US); Barry West, Temple, NH (US)

(73) Assignee: COLLISION COMMUNICATIONS, INC, Peterborough, NH (US)

( * ) Notice: Subject to any disclaimer, the term of this patent is extended or adjusted under 35 U.S.C. 154(b) by 308 days.

(21) Appl. No.: 14/059,867

(22) Filed: Oct. 22, 2013

(65) Prior Publication Data
US 2015/0111593 A1   Apr. 23, 2015

(51) Int. Cl.
*H04W 72/08*    (2009.01)
*H04W 52/22*    (2009.01)
*H04W 52/50*    (2009.01)
H04B 17/373    (2015.01)

(52) U.S. Cl.
CPC ....... *H04W 72/082* (2013.01); *H04W 52/223* (2013.01); *H04W 52/50* (2013.01); *H04B 17/373* (2015.01)

(58) Field of Classification Search
CPC . H04W 72/082; H04W 24/02; H04W 52/223; H04W 52/50; H04B 17/373
See application file for complete search history.

(56) References Cited

U.S. PATENT DOCUMENTS

| | | | | |
|---|---|---|---|---|
| 6,603,980 B1 * | 8/2003 | Kitagawa | ............... | H04W 52/04 370/310 |
| 2006/0234715 A1 * | 10/2006 | Cho | ...................... | H04L 5/0044 455/447 |
| 2008/0267165 A1 * | 10/2008 | Bertrand | ........... | H04W 56/0005 370/350 |
| 2010/0322227 A1 * | 12/2010 | Luo | ........................ | H04B 7/024 370/345 |
| 2011/0103241 A1 * | 5/2011 | Cho | ...................... | H04L 5/0007 370/252 |

(Continued)

*Primary Examiner* — Mehmood B Khan

(57) ABSTRACT

A method and system are described for improving operating efficiency and QoS in a cellular communications network. According to an exemplary embodiment, the method includes predicting background interference levels due at least partly to signals generated in neighboring cells, and transmitting operating parameters to user equipment that include power, frequency, and/or spectral efficiency parameters. The operating parameters are selected according to the predicted background interference to provide acceptable quality of service while also optimizing use of available bandwidth. The method further includes updating the background interference predictions, and transmitting revised operating parameters to the user equipment according to rules that minimize changes to operating parameters that strongly affect background interference in neighboring cells, such as power levels and frequencies, thereby minimizing background interference fluctuations. Power levels for user equipment entering the cell can be initially minimized, and then slowly ramped to an optimal level. SPS can be implemented.

23 Claims, 6 Drawing Sheets

(56) References Cited

U.S. PATENT DOCUMENTS

| | | | |
|---|---|---|---|
| 2011/0205923 A1* | 8/2011 | Doll | H04W 24/10 370/252 |
| 2012/0093093 A1* | 4/2012 | Frenger | H04B 7/0452 370/329 |
| 2012/0115531 A1* | 5/2012 | Gaal | H04B 7/04 455/522 |
| 2012/0295611 A1* | 11/2012 | Amirijoo | H04W 52/146 455/424 |
| 2012/0327867 A1* | 12/2012 | Kela | H04W 72/082 370/329 |
| 2013/0040683 A1* | 2/2013 | Siomina | H04W 28/0236 455/517 |
| 2013/0272170 A1* | 10/2013 | Chatterjee | H04W 28/02 370/280 |
| 2013/0315093 A1* | 11/2013 | Jiang | H04W 52/241 370/252 |
| 2014/0036737 A1* | 2/2014 | Ekpenyong | H04W 8/245 370/280 |
| 2014/0044083 A1* | 2/2014 | Kim | H04L 5/001 370/329 |
| 2014/0098761 A1* | 4/2014 | Lee | H04W 74/006 370/329 |
| 2014/0105136 A1* | 4/2014 | Tellado | H04L 5/0058 370/329 |
| 2014/0126530 A1* | 5/2014 | Siomina | H04W 52/146 370/330 |
| 2014/0153535 A1* | 6/2014 | Lei | H04L 1/1861 370/329 |
| 2014/0226629 A1* | 8/2014 | Kim | H04W 36/0016 370/331 |
| 2014/0241276 A1* | 8/2014 | Berberana | H04L 5/0073 370/329 |
| 2014/0247743 A1* | 9/2014 | Seo | H04W 24/10 370/252 |
| 2014/0254452 A1* | 9/2014 | Golitschek | H04W 52/0216 370/311 |
| 2014/0274093 A1* | 9/2014 | Abdelmonem | H04L 5/0026 455/452.1 |
| 2015/0049689 A1* | 2/2015 | Seo | H04L 5/005 370/329 |
| 2015/0098453 A1* | 4/2015 | Han | H04B 7/0671 370/336 |

\* cited by examiner

Background Interference

Background Interference

METHOD AND SYSTEM FOR IMPROVING EFFICIENCY IN A CELLULAR COMMUNICATIONS NETWORK

FIELD

This subject matter disclosed relates to telecommunications, and more particularly, to methods of operating base stations in a cellular communications network.

BACKGROUND

With reference to FIG. 1, cellular networks typically includes a plurality of adjacent cells 100, each of which is managed by a centralized scheduling device 102, commonly referred to as a base station ("BS"), which communicates with subscribers 104 that are located within the cell 100 and connected to the BS 102. The subscribers 104 are commonly referred to as user equipment ("UE").

Each UE transmits and receives data to external networks through the BS, which tightly controls what, when, and how the UE's are allowed to transmit and receive. When a UE sends data to the BS, commonly referred to as an "uplink," it first requests scheduling resources from the BS, and then waits for its scheduling grant before it actually transmits. The BS allocates certain blocks in time and/or frequency to the UE, and determines the best operating parameters for the UE to use when transmitting. The operating parameters typically include the transmission power, communication frequency, time slot, and spreading code allocated to the UE, as well as instructions regarding spectral efficiency parameters such as which modulation and coding scheme ("MCS") to use. In addition, the operating parameters may include other parameters that affect the transmission of the signal.

The base station selects and updates the operating parameters for all of the UE's in the cell according to a set of base station operating rules, which are configured to balance and optimize various desirable characteristics of the network. These can include network capacity, fairness, Quality of Service ("QoS"), and such like.

In particular, the base station must take into account background noise and interference when assigning operating parameters to the UE's. For example, if a certain frequency band has low background interference, the BS may choose to lower the transmit power of the UE assigned to that channel, and/or may instruct the UE to use an efficient but relatively fault intolerant MCS. On the other hand, if the background noise and interference in a certain frequency band is high, and if the BS needs to use that frequency band so as to accommodate all of the UE's in the cell, then the base station may assign a UE to a channel in that frequency band, and instruct the UE to use a relatively higher transmitting power and/or a slower but more fault tolerant MCS.

Often, background interference is a major component of the overall background noise and interference. Background interference arises from transmissions that stray into the cell from UE's in adjacent cells. Referring again to FIG. 1, it is clear that UE's located near cell boundaries can be physically close to each other, even though they are located in different cells. Since the UE signals are transmitted omnidirectionally, transmissions from UE's near cell boundaries will stray into neighboring cells. And because UE's in different cells are managed by different base stations, there is a high likelihood that some of these stray signals will interfere with communications in the adjacent cells.

Accordingly, a BS typically selects and assigns operating parameters to a UE according to a predicted Signal to Interference and Noise Ratio (SINR) for a selected communication channel. Typically, the BS will make measurements of background interference, or of background interference-plus-noise, and will use these measurements in predicting future interference-plus-noise. These predictions may be based on single measurements, but often a plurality of measurements of background interference-plus-noise are made before each SINR prediction, producing a distribution of interference measurements that can be represented as a histogram, possibly with an approximately Gaussian distribution. The prediction of future interference-plus-noise is then based on an average of the measurements, with a margin added to ensure quality of service, or possibly on the shape and width of the histogram.

Once the predicted SINR is determined, appropriate operating parameters are selected and transmitted to the UE's. This process is repeated periodically by making new predictions based on new measurements of the background interference or background interference-plus-noise, updating the operating parameters, and transmitting the updated operating parameters to the UE's. Note that selection of the operating parameters may also be affected by other factors, such as the number of simultaneous users, etc.

As noted above, background interference is often significant and much larger than the noise. Unfortunately, background interference in a cell can vary rapidly, as new UE's initiate or cease communications with base stations in neighboring cells, and as the neighboring base stations make changes to the operating parameters of their UE's, often in response to rapid fluctuations in background interference experienced by these neighboring cells.

These rapid fluctuations in background interference levels can lead to large variances between the estimated background interference levels, based on measurements made at an earlier time, and the actual background interference levels experienced when the signal arrives at a later time. For example, a typical histogram 300 of background interference measurements in the prior art is shown in FIG. 3. The histogram 300 is the result of performing a large number of repeated measurements of background interference, and plotting a curve 300 that shows the relative number of measurement results corresponding to each value of background interference. A typical MCS selection algorithm will then choose an expected level of background interference based on the average background interference plus some margin, so as to ensure quality of service. This expected background interference level will be used to calculate an expected SINR, which is then used for selecting the MCS.

The curve in FIG. 3 is approximately Gaussian, but other shapes may occur in practice. This broad histogram 300 of the prior art can be divided into two regions 302, 304, according to the accuracy of the prediction of background interference. Line 306 represents the background interference prediction that a base station 102 will likely make based on the histogram 300 of previous background interference measurements, which is the average interference level plus some margin. The base station 102 will then calculate an expected SINR from the expected interference level and choose appropriate operating parameters.

If the actual background interference is in region 302 when the UE 104 later transmits, ie. is less than the predicted background interference level 306, and hence the SINR is actually higher than expected, the base station 102 could have successfully chosen operating parameters for UE 104 to obtain higher spectral efficiency. If the actual background interference is in the region 304 when the UE 104 later transmits, ie. is greater than the predicted interference level 306, and hence the SINR is actually lower than expected, the UE 104 to likely to have a packet error necessitating a packet retransmission.

Therefore any deviation of the actual background interference from the predicted background interference causes the base station 102 to allocate non optimal operating parameters to the UE 104. Accordingly, the quality and efficiency with which a cell is managed depends to a significant extent on the accuracy of the background interference predictions made by its base station.

One approach to improving this situation is for the BS to transmit modified operating parameters to a UE shortly after the UE has transmitted one or more times to the BS, where the modified operating parameters are based on a bit error rate, packet error rate, or another error rate experienced during these initial transmissions. However, this approach still suffers from inaccurate predictions of the SINR, due to the very rapid fluctuations of the background interference.

Many networks have the ability to operate with Semi-Persistent Scheduling (SPS). SPS occurs when a UE is instructed to use a given set of operating parameters for more than a single transmission. SPS can be advantageous, because most traffic in a cell is not in the form of tiny bursts of data, and so the scheduling overhead to update the operating parameters for each packet could otherwise be needlessly burdensome. SPS can also provide some improvement in the SINR estimates, because the measurements of background interference or background interference-plus-noise can be made over longer periods of time, thereby providing better averaging of the background interference fluctuations.

However, even predictions of background interference based on longer averaging periods can be unreliable. Also, it may not be possible to implement SPS in a given network, due to other factors and priorities of the network. For example, many networks include base station operating rules that require that the UE's be "hopped" rapidly between communication frequency bands, so that each of the UE's experiences approximately the same QoS.

Of course, if the base stations were able to communicate directly and fully with each other, so that each base station knew in advance what the others were planning to do, then predictions of background interference could be significantly improved. However, such comprehensive inter-BS communication is typically prohibitive.

What is needed, therefore, is a method for improving the operating efficiency and quality of service in a cellular communications network by improving the accuracy of the SINR predictions made by the base stations.

SUMMARY

Accordingly, a method and system are described for improving the operating efficiency and quality of service in a cellular communications network. Embodiments improve the accuracy of background interference-plus-noise predictions made by the base stations ("BS's") by reducing the average size and rate of fluctuation of the background interference, so that current measurements of background interference-plus-noise are good predictors of future levels of background interference-plus-noise. Note that background interference is typically the dominant contributor to the overall background interference-plus-noise According to an exemplary embodiment, a method is described that includes determining a prediction of a level of background interference for a communication channel, where the background interference is due at least in part to signals generated in a neighboring cell, and transmitting operating parameters to user equipment communicating with the base station, where the operating parameters are selected according to the background interference level prediction so as to provide acceptable quality of service for the user equipment while also optimizing use of available bandwidth. The operating parameters can include transmission power, communication frequency, time slot, spreading code, and/or spectral efficiency parameters. The method further includes updating the background interference level prediction, and selecting revised operating parameters according to the updated background interference level prediction, where the revised operating parameters are selected according to base station operating rules that specify a preference for minimizing changes to UE operating parameters that strongly affect background interference, such as transmission power, frequency band, time slot, spreading code, and such like, thereby minimizing fluctuations of background interference levels and improving predictions of future background interference. The revised operating parameters are then transmitted to the user equipment According to another exemplary embodiment, a system is described for improving the operating efficiency and quality of service in a cellular communications network. The system includes a transmitter and a controller. The transmitter is configured for transmitting operating parameters to user equipment operating within a cell managed by a base station. The controller is configured to predict a level of background interference for a communication channel, where the background interference is due at least in part to signals generated in a neighboring cell, and to provide the transmitter with operating parameters to transmit to user equipment communicating with the base station. The operating parameters can include transmission power, communication frequency, time slot, spreading code, and/or spectral efficiency parameters, and are selected according to the background interference level prediction so as to provide acceptable quality of service for the user equipment while also optimizing use of available bandwidth. The controller is further configured to update the background interference level prediction, and select revised operating parameters according to the updated background interference level prediction, where the revised operating parameters are selected according to base station operating rules that specify a preference for minimizing changes to UE operating parameters that strongly affect background interference, such as transmission power, frequency band, time slot, spreading code, and such like used by the user equipment, thereby improving predictions of future background interference, and minimizing fluctuations of background interference levels. The revised operating parameters are then provided to the transmitter for transmission to the user equipment.

According to yet another exemplary embodiment, a non-transitory computer-readable medium is described for improving the operating efficiency and quality of service in a cellular communications network, where the computer-readable medium is storing a computer program that is executable by a machine for operating a base station of a communications cell. The computer program includes executable instructions for determining a prediction of a level of background interference for a communication channel, where the background interference is due at least in part to signals generated in a neighboring cell. The computer program further includes instructions for transmitting operating parameters to user equipment, the operating parameters including at least one of transmission power, communication frequency, time slot, spreading code, and spectral efficiency parameters, the operating parameters being selected based on the background interference level prediction so as to provide acceptable quality of service for the user equipment while also optimizing use of available bandwidth. Additionally, the computer program includes executable instructions for updating the background interference level prediction, and selecting revised operating parameters according to the updated background interference level prediction, where the revised operating parameters are selected according to base station operating rules that specify a preference for minimizing changes to UE operating parameters that strongly affect background interference, such as transmission power, frequency band, time slot, spreading code, and such like, to thereby minimize fluctuations of background interference levels. The revised operating parameters are then transmitted to the user equipment.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

A method and system are described for improving the operating efficiency and quality of service in a cellular communications network. Embodiments improve the accuracy of Signal to Interference and Noise ("SINR") predictions made by the base stations ("BS's") by reducing the fluctuation of the background interference, so that current measurements of background interference are good predictors of future levels of background interference.

Figure 1:
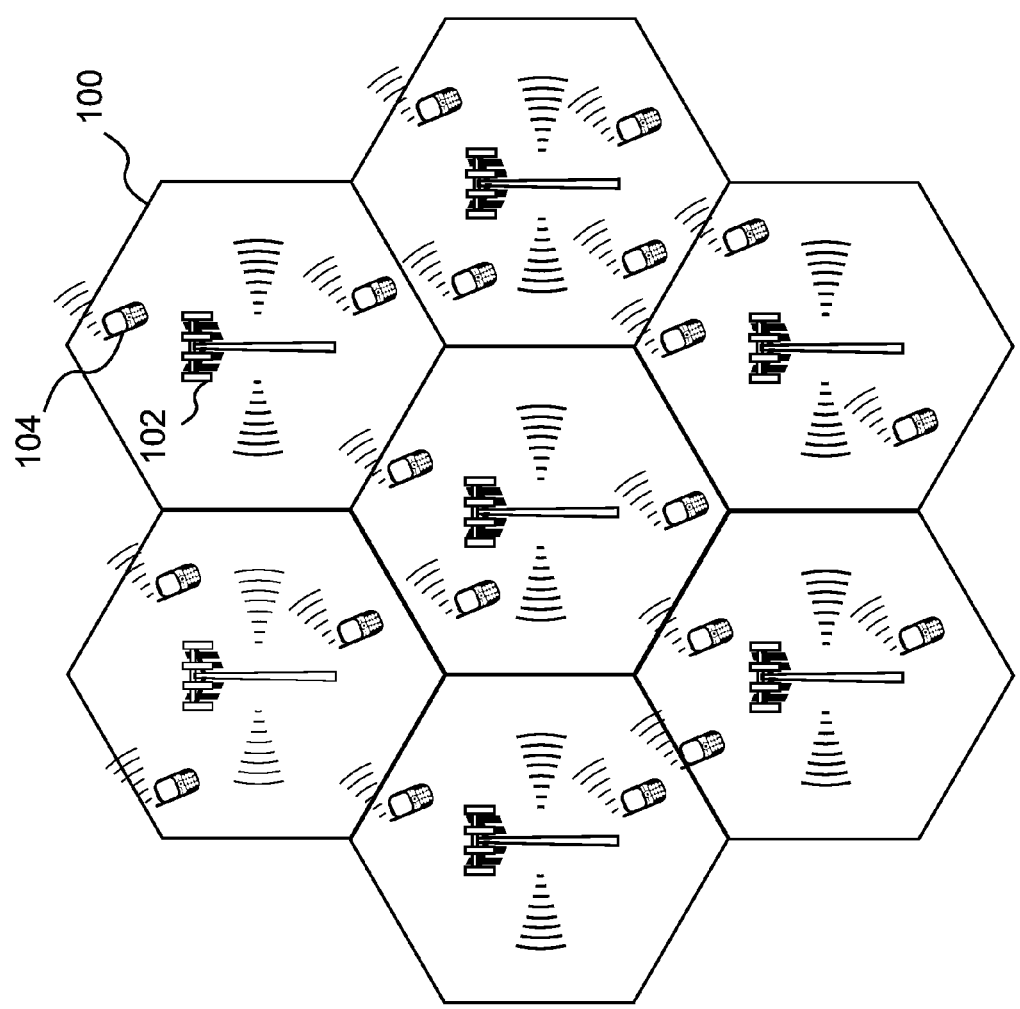
FIG. 1 is a simplified diagram showing a plurality of adjacent communication cells according to exemplary embodiments.
Figure 2:
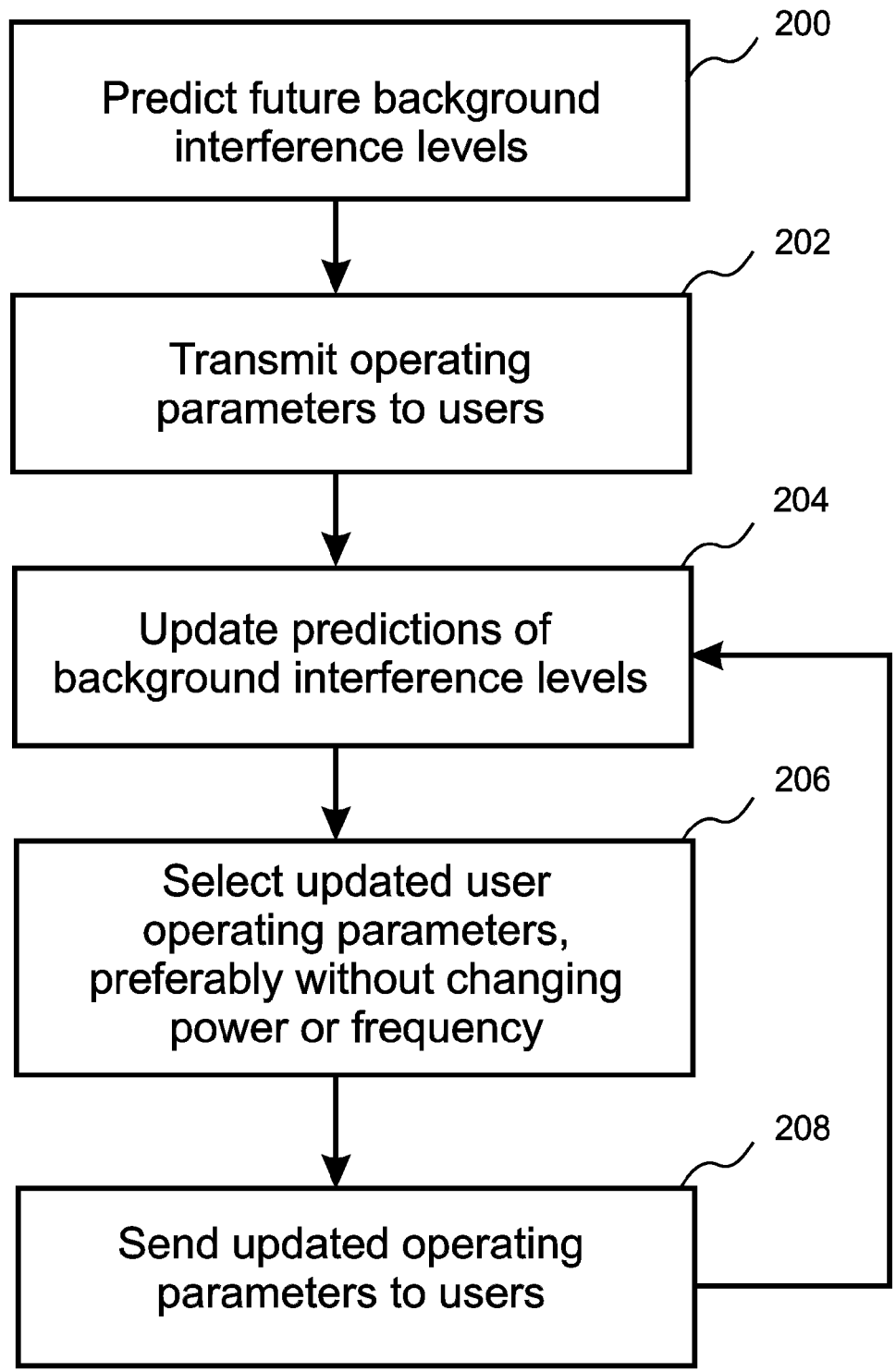
FIG. 2 is a flow diagram illustrating actions taken by the base station according to an exemplary method embodiment.
Figure 3:
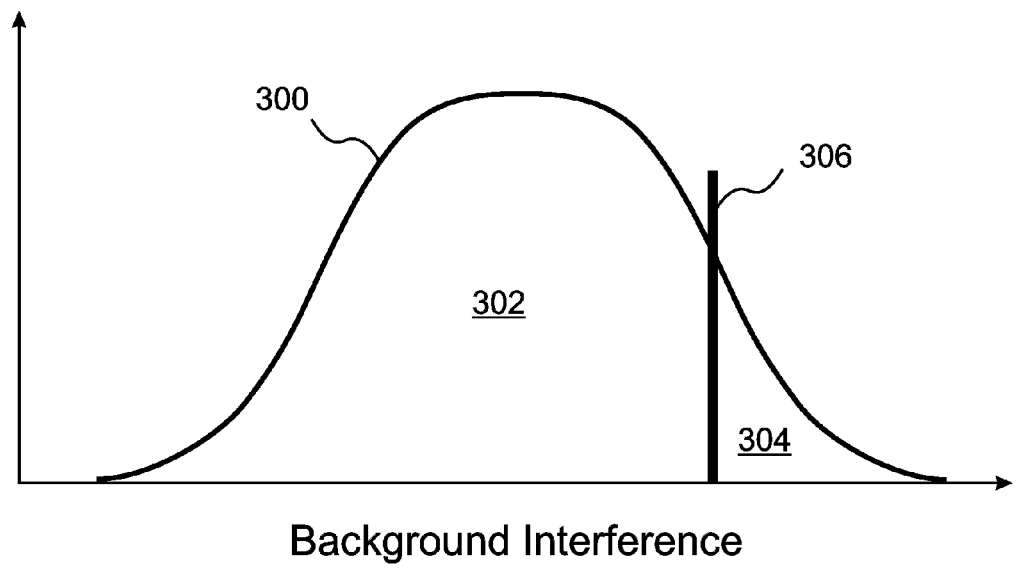
FIG. 3 is a histogram illustrating a distribution of background interference measurements typical of the prior art.

With reference to FIG. 2, method embodiments include predicting future background interference levels 200 and transmitting operating parameters to user equipment in the cell 202. The predictions of background interference are then updated 204, and revised operating parameters are selected according to base station operating rules that specify a preference for making changes primarily or exclusively to those UE operating parameters that have little or no effect on background interference in neighboring cells, for example by minimizing changes to the power levels, frequencies, time slots, and spreading codes used by the user equipment, thereby minimizing fluctuations of background interference levels 206. The revised operating parameters are then transmitted to the user equipment 208.

Some operating parameters have a greater effect than others on the background interference experienced in neighboring cells. For example, increasing or decreasing the transmission power of a UE operating at a given frequency will typically have a strong effect on the level of background interference experienced by a nearby UE that is using the same frequency in an adjacent cell. Similarly, changing a UE's transmission frequency may cause it to suddenly interfere with a UE in a neighboring cell with which it did not previously interfere. Changing the time slot and/or spreading code may also strongly affect the background interference in neighboring cells.

On the other hand, some operating parameters have little or no effect on background interference in neighboring cells. For example, changing the MCS for a given UE, while holding all other parameters constant will typically have little or no effect on background interference in neighboring cells.

Accordingly, if a group of neighboring base stations all revise their operating parameters according to base station operating rules that specify a preference for changing only those parameters that have minimal effect on background interference, then the background interference experienced by the base stations will be more constant, and hence the predictions of future background interference and SINR will be more accurate, allowing selection of more efficient operating parameters.

Note that the executable instructions of a computer program as illustrated in FIG. 2 for improving the operating efficiency and quality of service in a cellular communications network can be embodied in any computer readable medium for use by or in connection with an instruction execution system, apparatus, or device, such as a computer based system, processor containing system, or other system that can fetch the instructions from the instruction execution system, apparatus, or device and execute the instructions.

In embodiments, predicting the background interference level 200, and updating the prediction 204, can include determining a background interference level for the communication channel and predicting that the background interference level will not change substantially during a subsequent time interval. The background interference level can be determined directly, by measuring the background interference level, and/or indirectly, by evaluating receiver statistics such as bit error rate ("BER"), packet error rate ("PER"), and/or block error rate ("BLER"). A plurality of measurements of the background interference level can be made, and can be formed into a histogram.

Semi-persistent scheduling ("SPS") can be implemented by the base station 102.

Figure 4:
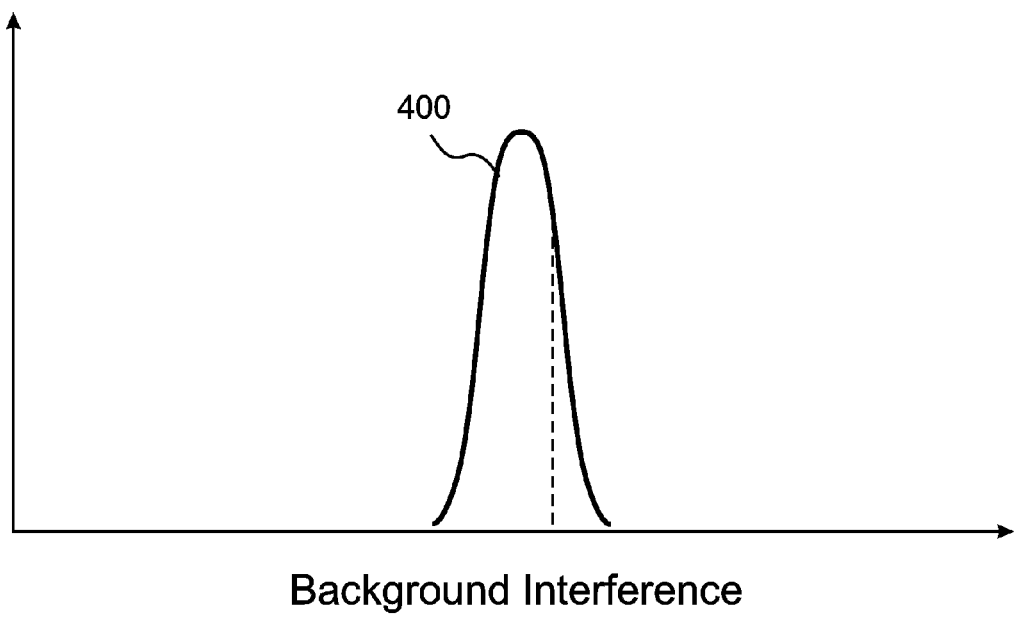
FIG. 4 is a histogram showing a much narrower distribution of background interference values due to implementation of an exemplary embodiment.

FIG. 4 is a background interference histogram 400 from a system to which the steps illustrated in FIG. 2 have been applied. Due to the resulting reduction of fluctuations in background interference, the histogram 400 is narrow, thereby allowing a much more accurate and less conservative prediction of the future background interference.

Figure 5:
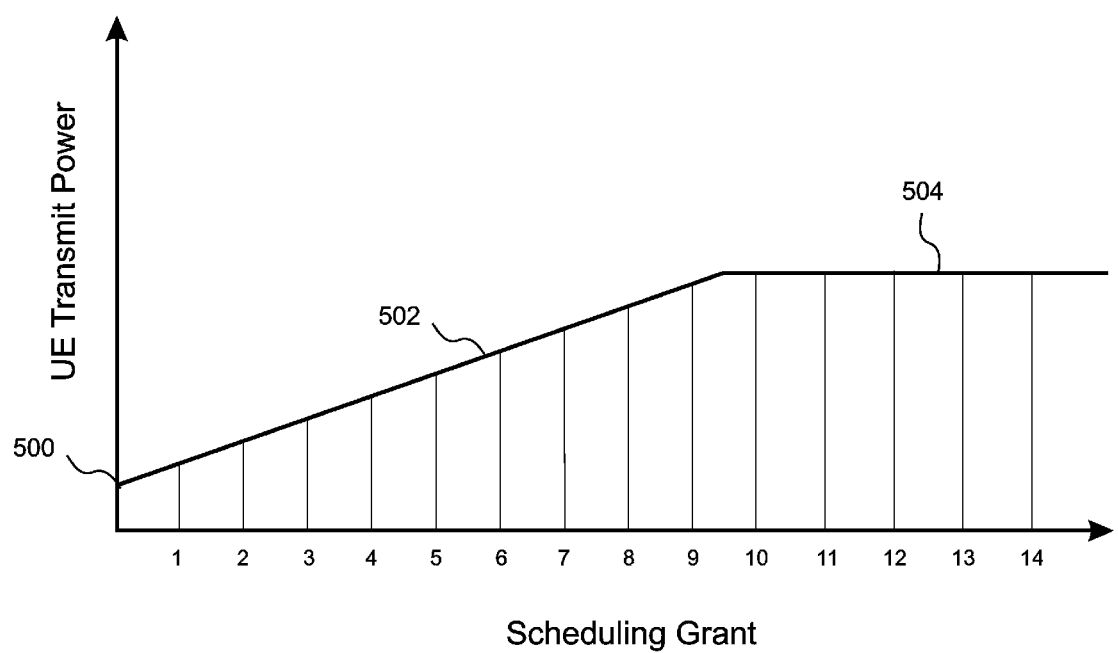
FIG. 5 is a graph illustrating entry of a new UE into a cell at a low transmission power, and then steady increase of the transmission power to an optimal level.

With reference to FIG. 5, in some embodiments the base station operating rules further include a preference for introducing new UE's 104 to the cell 100 at a relatively low initial transmit power level 500 and a highly fault-tolerant MCS, and then steadily increasing the transmit power 502 during a plurality of scheduling grant time intervals until it reaches an optimal level 504 with optimal MCS. This approach causes the resulting background interference in neighboring cells 100 to change incrementally over several scheduling grant periods, rather than causing a sudden jump in background interference from one scheduling period to the next.

Figure 6:
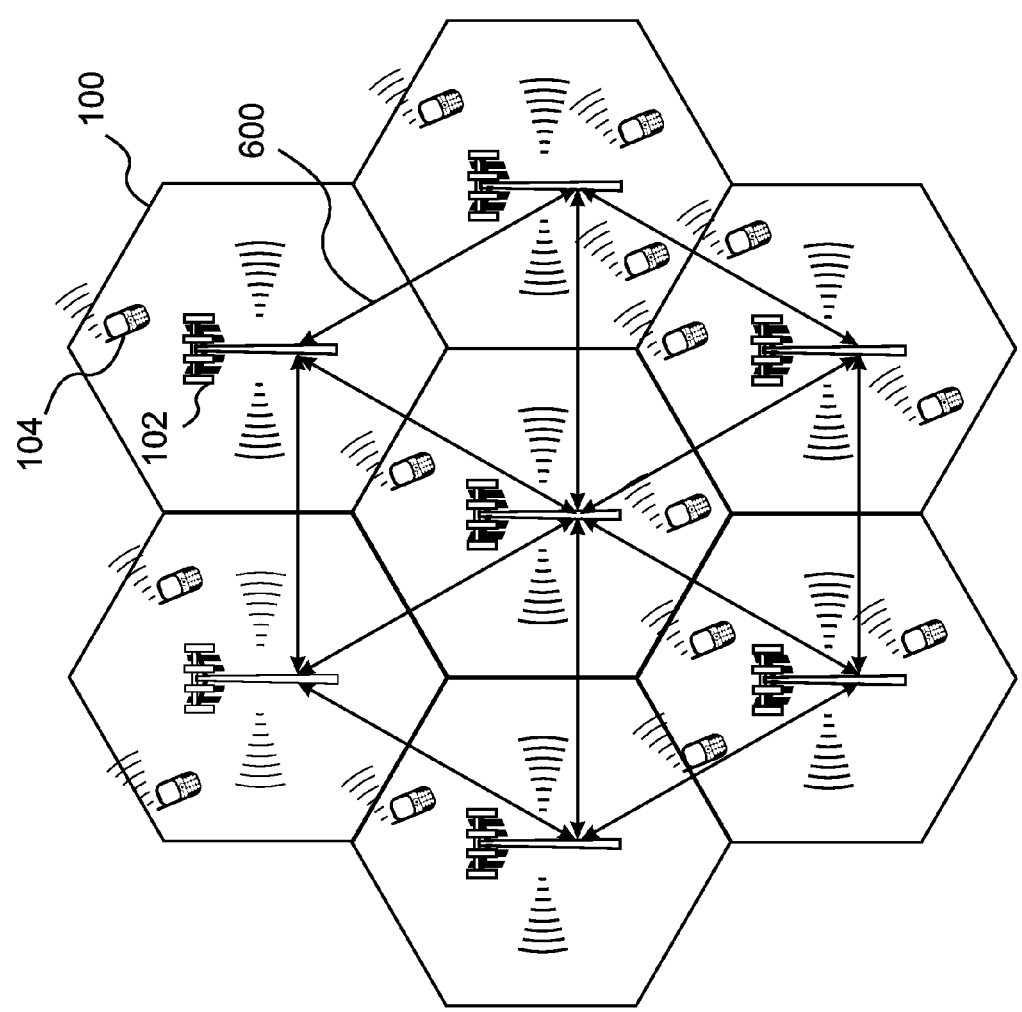
FIG. 6 is a simplified diagram similar to FIG. 1, but including limited direct channels of communication between adjacent base stations.

With reference to FIG. 6, if limited direct communication 600 is available between base stations 102, the method can include each base station transmitting to its neighbors 102 information regarding new UE's 104 joining the cell 100, so that the information can be used by the neighboring base stations 102 to improve predictions of future background interference. In some of these embodiments, the information transmitted between base stations 600 further includes information regarding a schedule by which the transmission power of the new UE will be increased, for example according to the approach illustrated in FIG. 5 and discussed above. The information can further include information regarding changes to transmission powers, frequencies, time slots, and/or spreading codes for established UE's in the cell.

The base station operating rules can specify a preference for responding whenever possible to changing interference level predictions by instructing user equipment to use different spectral efficiency parameters, because changes to spectral efficiency parameters typically have little or no effect on background interference in neighboring cells.

Figure 7:
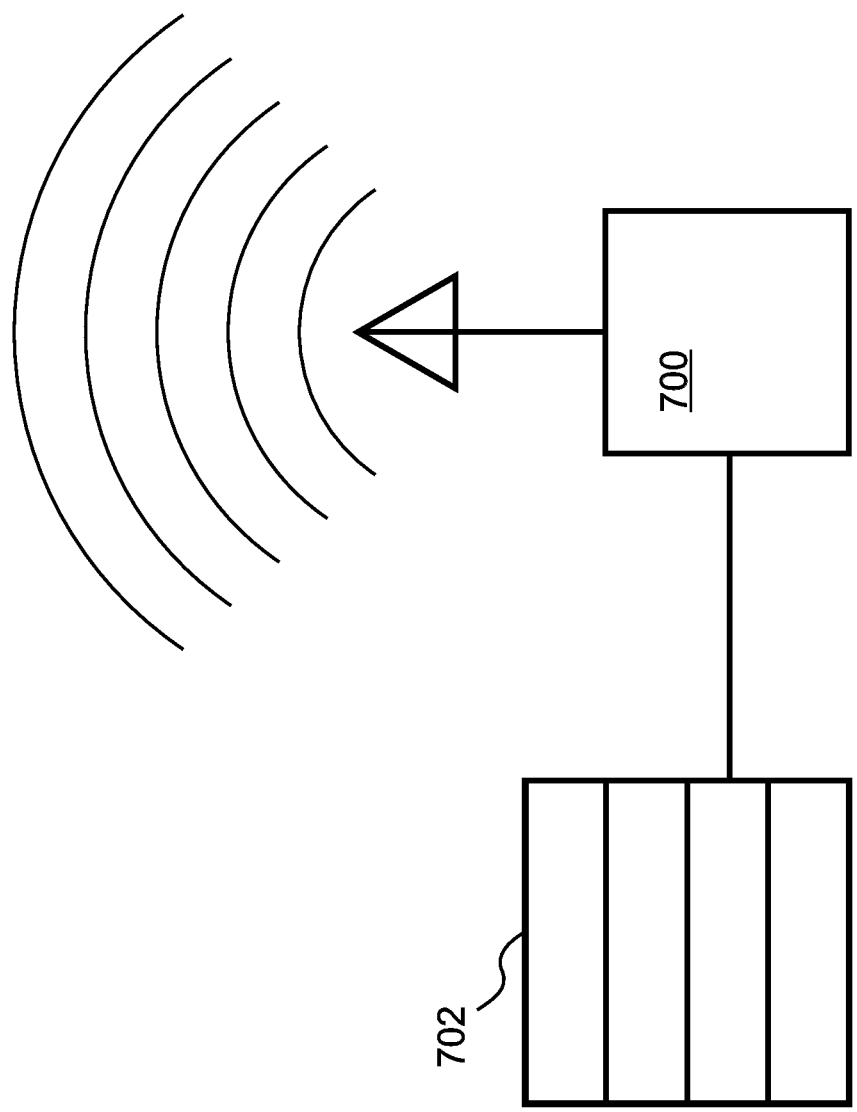
FIG. 7 is a simplified block diagram of an exemplary system embodiment.

With reference to FIG. 7, system embodiments include a transmitter 700 and a controller 702. The controller is configured to determine a prediction of a level of background interference for a communication channel, where the background interference is due at least in part to signals generated in a neighboring cell. The controller is further configured to provide the transmitter with operating parameters to transmit to user equipment communicating with the base station, the operating parameters including transmission power, communication frequency, time slot, spreading code, and/or spectral efficiency parameters. The operating parameters are selected according to the background interference level prediction so as to provide acceptable quality of service for the user equipment, while also optimizing use of available bandwidth. In addition, the controller is configured to update the background interference level prediction, and to select revised operating parameters according to the updated background interference level prediction, where the revised operating parameters are selected according to base station operating rules that specify a preference for minimizing changes to the power levels, frequencies, time slots, and spreading codes used by the user equipment to thereby minimize fluctuations of background interference levels. The revised operating parameters are then provided to the transmitter for transmission to the user equipment.

The controller 702 is an instruction execution machine, apparatus, or device and may comprise one or more of a microprocessor, a digital signal processor, a graphics processing unit, an application specific integrated circuit (ASIC), a field programmable gate array (FPGA), and the like. The controller 102 may be configured to execute program instructions stored in a memory and/or data storage (both not shown). The memory may include read only memory (ROM) and random access memory (RAM). The data storage may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

The controller 702 and transmitter 700 are preferably incorporated into a BS that operates in a networked environment using logical connections to one or more remote nodes (not shown). The remote node may be another BS, a UE, a computer, a server, a router, a peer device or other common network node. The base station may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000®, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP).

CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. Other examples of wireless networks include, for example, a BLUETOOTH network, a wireless personal area network, and a wireless 802.11 local area network (LAN).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

It should be understood that the arrangement of illustrated in FIG. 7 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 7. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

We claim:

1. A method of improving background interference level predictions in a cellular communications system including at least a first and second base station ("BS") each serving respective first and second cells, the method comprising:
   determining a background interference level received at the first BS caused at least in part by wireless signals generated by a second user equipment ("UE") served by the second cell;
   determining a background interference level received at the second BS caused at least in part by wireless signals generated by a first UE served by the first cell;

determining revised operating parameters for the first UE that minimize changes to the background interference level received at the second BS;
determining revised operating parameters for the second UE that minimize changes to the background interference level received at the first BS;
wherein the revised operating parameters for the first UE and the second UE include at least one of transmission power, communication frequency, time slot, spreading code, and spectral efficiency parameters;
transmitting the respective revised operating parameters to the first UE and the second UE; and
predicting a future background interference level at each of the first and second BS based on the respective determined background interference level and the revised operating parameters.

2. The method of claim 1, wherein determining the background interference level includes measuring a level of background interference or background interference plus noise for a communication channel.

3. The method of claim 2, wherein measuring the level of background interference or background interference plus noise includes making a plurality of measurements of the background interference or background interference plus noise.

4. The method of claim 1, wherein determining the background interference level includes evaluating receiver statistics for the communication channel.

5. The method of claim 4, wherein the receiver statistics include at least one of a bit error rate ("BER"), a packet error rate ("PER"), and a block error rate ("BLER").

6. The method of claim 1, wherein semi-persistent scheduling ("SPS") is implemented by the first BS.

7. The method of claim 1, wherein when the second base station is initiating communication with a new UE, operating parameters are sent to the new UE that initially minimize a transmission power of the new UE, and then incrementally increase the transmission power of the new UE to an optimal level during a specified time interval.

8. The method of claim 1, further comprising communicating information to at least one neighboring BS, said information including at least a transmission power level assigned to new UE that is initiating communication with the second BS, said information being used by the first BS for determining the background interference prediction.

9. The method of claim 8, wherein said information further includes a schedule for increasing a transmission power of the new UE.

10. The method of claim 8, wherein said information further includes information regarding changes to at least one of a UE transmission power level and a UE transmission frequency.

11. The method of claim 1, wherein the first and second BS respond whenever possible to changing background interference predictions by instructing the respective UE to use different spectral efficiency parameters.

12. A system for improving background interference level predictions in a cellular communications system including at least a first and second BS each serving respective first and second cells, the system comprising:
respective controllers for the first and second BS configured to:
determine a background interference level received at the first BS caused at least in part by wireless signals generated by a second user equipment ("UE") served by the second cell;
determine a background interference level received at the second BS caused at least in part by wireless signals generated by a first UE served by the first cell;
determine revised operating parameters for the first UE that minimize changes to the background interference level received at the second BS;
determine revised operating parameters for the second UE that minimize changes to the background interference level received at the first BS;
wherein the revised operating parameters for the first UE and the second UE include at least one of transmission power, communication frequency, time slot, spreading code, and spectral efficiency parameters; and
predict a future background interference level at each of the first and second BS based on the respective determined background interference level and the revised operating parameters; and
respective transmitters for the first and second BS configured to transmit the respective revised operating parameters to the first UE and the second UE.

13. The system of claim 12, wherein the controllers are configured to determine the first the background interference level based on a measurement of a level of background interference or background interference plus noise for a communication channel.

14. The system of claim 12, wherein the controllers are configured to determine the first background interference level based on a plurality of measurements of the background interference or background interference plus noise.

15. The system of claim 12, wherein the controllers are configured to determine the first background interference level based on an evaluation of receiver statistics for the communication channel.

16. The system of claim 15, wherein the receiver statistics include at least one of a BER, a PER, and a BLER.

17. The system of claim 12, wherein SPS is implemented by the controllers.

18. The system of claim 12, wherein the first and second BS initiate communication with a new UE, for sending operating parameters to the new UE that initially minimize a transmission power of the new UE, and then incrementally increase the transmission power of the new UE to an optimal level during a specified time interval.

19. The system of claim 12, wherein the controllers are part of the first and second BS, respectively, and are configured to communicate information that includes at least a transmission power level assigned to new UE that is initiating communication with the respective first and second BS.

20. The system of claim 19, wherein the information further includes a schedule for increasing a transmission power of the new UE.

21. The system of claim 19, wherein the information further includes information regarding changes to at least one of a UE transmission power level and a UE transmission frequency.

22. The system of claim 12, wherein the first and second BS respond whenever possible to changing background interference predictions by instructing the respective UE to use different spectral efficiency parameters.

23. A non-transitory computer readable medium storing a computer program, executable by a machine, for improving background interference level predictions in a cellular communications system including at least a first and second BS each serving respective first and second cells, the computer program comprising executable instructions for:
- determining a background interference level received at the first BS caused at least in part by wireless signals generated by a second user equipment ("UE") served by the second cell;
- determining a background interference level received at the second BS caused at least in part by wireless signals generated by a first UE served by the first cell;
- determining revised operating parameters for the first UE that minimize changes to the background interference level received at the second BS;
- determining revised operating parameters for the second UE that minimize changes to the background interference level received at the first BS;
- wherein the revised operating parameters for the first UE and the second UE include at least one of transmission power, communication frequency, time slot, spreading code, and spectral efficiency parameters;
- transmitting the respective revised operating parameters to the first UE and the second UE; and
- predicting a future background interference level at each of the first and second BS based on the respective determined background interference level and the revised operating parameters.

* * * * *